United States Patent
Schütz et al.

[11] Patent Number: 5,946,902
[45] Date of Patent: Sep. 7, 1999

[54] GAS TURBINE ENGINE WITH TILTED BURNERS

[75] Inventors: Herbert Schütz, Uttenreuth; Werner Kraupa, Fürth, both of Germany; Heinz Termühlen, Elm Grove, Wis.

[73] Assignee: Siemens Aktiengesellschaft, Munich, Germany

[21] Appl. No.: 08/942,226

[22] Filed: Oct. 1, 1997

[51] Int. Cl.⁶ .................................. F02C 3/14; F02C 7/00
[52] U.S. Cl. .......................................... 60/39.35; 415/151
[58] Field of Search ................ 60/39.25, 39.36, 60/39.37; 415/151, 155, 159

[56] References Cited

U.S. PATENT DOCUMENTS

| | | | |
|---|---|---|---|
| 2,567,079 | 9/1951 | Owner et al. | 60/39.37 |
| 2,651,492 | 9/1953 | Feilden | 60/39.25 |
| 4,387,563 | 6/1983 | Bell | 60/39.25 |
| 4,638,628 | 1/1987 | Rice | 30/39.36 |

*Primary Examiner*—Louis J. Casaregola
*Attorney, Agent, or Firm*—Herbert L. Lerner; Laurence A. Greenberg

[57] ABSTRACT

A high degree efficiency in a gas turbine is assured by imposing a rifling swirl on the operating medium. The gas turbine has a turbine shaft and a number of burners that discharge into a combustion chamber configuration. The primary burner axis of each burner is tilted relative to the primary axis of the turbine shaft such that a defined swirl is created in the operating medium. An especially effective transfer of momentum from the flowing operating medium AM to a rotor blade configuration, particularly in full-load operation of the gas turbine, is thus attained without additional structural parts between the combustion chamber configuration and the rotor blade configuration.

12 Claims, 3 Drawing Sheets

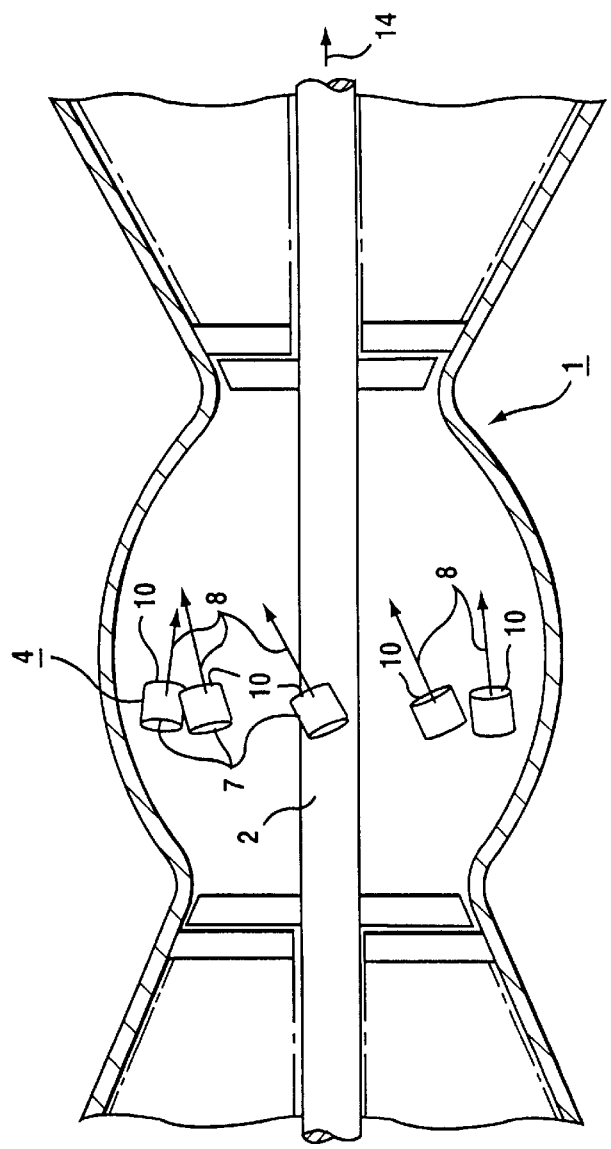
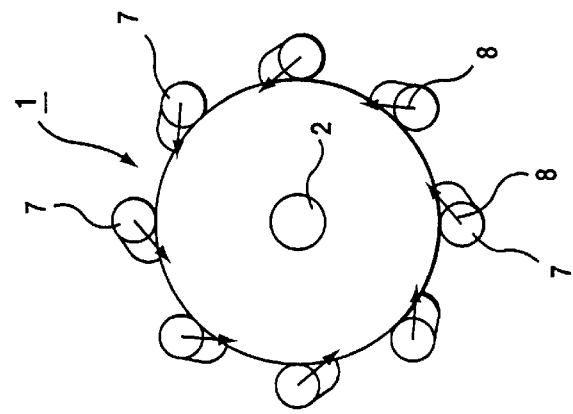

GAS TURBINE ENGINE WITH TILTED BURNERS

BACKGROUND OF THE INVENTION

FIELD OF THE INVENTION

The invention pertains to gas turbines, and in particular to a gas turbine with a turbine shaft and a combustion chamber configuration that has a number of burners which in operation create an operating medium from a fuel.

Gas turbines are used in many fields for driving generators or machines. The energy content of a fuel is utilized to generate the rotary motion of a turbine shaft. To that end, the fuel is combusted in the burners discharging into the combustion chamber, air being delivered compressed by an air compressor. A high-pressure operating medium with a high temperature is created by the combustion of the fuel. The operating medium flows from the combustion chamber toward a turbine blade configuration, which typically includes a number of guide blades and a number of rotor blades. The guide blades are connected in stationary fashion to the housing of the turbine and serve to orient and smooth the flow profile of operating medium in the region in the region of the turbine blade configuration. Conversely, the rotor blades are connected to the turbine shaft, so that a transfer of the operating medium impetus to the rotor blades generates or maintains the rotary motion of the turbine shaft. The guide blades and the rotor blades are combined into sets of guide blades and rotor blades, respectively, which are connected in alternating succession one after the other in the flow direction of the operating medium.

The burners of such a gas turbine are typically arranged such that their primary axes are located on a conical surface whose axis of symmetry is the primary axis of the turbine shaft. The primary axis of a burner is then defined by its primary flame direction. It is accordingly orthogonal to its exit plane. The flow profile of the operating medium generated by these burners thus has a meridional preferential direction, so that the flow of operating medium at the combustion chamber outlet is parallel to the primary axis of the turbine shaft.

In operation of the gas turbine, to drive the turbine shaft, a sufficiently high transfer of momentum to the rotor blades is needed. However, that is unattainable by means of a primarily meridional flow of the operating medium. Therefore the first set of rotor blades, in terms of the flow direction of the operating medium, is typically preceded by a first set of guide blades. This first set of guide blades, or deflection set, is designed in such a way that the operating medium flowing in the direction of the primary axis of the turbine shaft is exposed to a tangential acceleration at the deflection set and is thus imparted a tangential velocity component. By means of this tangential velocity component, which is equivalent to a zonal component of the operating medium flow profile, the aforementioned adequate momentum transfer of the operating medium to the rotor blades is assured. However, the guide blades and rotor blades bathed by the operating medium are heated by heat exchange with this operating medium, so that in gas turbine operation, cooling of the guide blades and rotor blades is typically required. Such cooling undesirably limits the efficiency of the gas turbine.

SUMMARY OF THE INVENTION

It is accordingly an object of the invention to provide a gas turbine, which overcomes the above-mentioned disadvantages of the heretofore-known devices and methods of this general type and which has a particularly high degree of efficiency. With the foregoing and other objects in view there is provided, in accordance with the invention, a gas turbine, comprising:

a turbine shaft extending along a primary turbine shaft axis; and a combustion chamber configuration with a plurality of burners generating an operating medium from a fuel;

each of the burners having a primary burner axis which is tilted relative to the primary axis of the turbine shaft so as to impose a swirl on the operating medium.

In other words, the object of the invention is satisfied in accordance with the invention in that the primary axis of each burner is inclined relative to the primary axis of the turbine shaft. This results in a rifling swirl in the working medium or operating gas.

The invention is based on the concept that the efficiency of a gas turbine can be increased by reducing the deflection losses in the guide blades and/or by decreasing the number of structural parts that have to be cooled. Economy in terms of structural parts is attainable by dispensing with the deflection set or the first set of guide blades or guide baffles downstream of the combustion chamber (in the flow direction of the operating medium). In order even without the deflection set to assure a proper momentum transfer from the operating medium to the rotor blades that is sufficient for operating the gas turbine, the burners of the gas turbine are arranged such that the flow of the operating medium on leaving the combustion chamber configuration, in addition to a meridional component, also has a zonal component. This is made possible by generating the swirl in the operating medium in the combustion chamber.

In accordance with an added feature of the invention, the burners are advantageously disposed symmetrically around the turbine shaft in such a way that the primary axes of all the burners have the same tilting relative to the primary axis of the turbine shaft. This result in a swirl that is especially well-adapted to the geometry of the first set of guide blades and the first set of rotor blades and is thus especially suitable for assuring especially effective momentum transfer from the operating medium to the rotor blades.

The combustion chamber of each burner may be embodied such that the swirl of the operating medium is obtained on the emergence thereof from the combustion chamber configuration.

For such a gas turbine, each combustion chamber is expediently shaped in such a way that the swirl of the operating medium is maintained upon its emergence from the combustion chamber configuration.

In accordance with an additional feature of the invention, the combustion chamber configuration is an annular combustion chamber. For an annular combustion chamber into which burners disposed symmetrically around the turbine shaft discharge, in the manner of a stepped annular combustion chamber, the result is that the hot zone of the flame cone of each burner comes to lie next to a comparatively colder zone of the flame cone of a neighboring burner. The result, because of heat exchange by radiation, is a temperature equalization between the flame cones of the burner, which increases the uniformity of the burnout. This kind of stepped annular combustion chamber thus has a "gentle" flame without pulsation disturbances and with complete burnout. The result is improved combustion at reduced peak temperatures, especially with a lesser NOx content of the exhaust gas. Accordingly, this kind of gas turbine can be operated with especially low pollution. Furthermore, a startup process of such a gas turbine with a stepped annular combustion chamber is especially unproblematic, because as a result of the heat exchange between cold zones and adjacent hot zones, especially reliable flame preservation is assured.

To enable operating the gas turbine at especially high efficiency in various load states, but in particular during the startup process, the combustion chamber configuration is advantageously followed in the flow direction of the operating medium by a number of modulatable guide blades. In full-load operation of the gas turbine, for which the generated swirl in the operating medium is designed to optimize the momentum transfer to the rotor blades, the modulatable guide blades are removed from the flow range of the operating medium. In the partial-load mode or also in the startup mode of the gas turbine, in which the swirl of the operating medium for design reasons may possibly not assure the best possible momentum transfer to the rotor blades, the modulatable guide blades, for modulation purposes and thus for adaptation of the tangential velocity component of the operating medium to the gas turbine operating state, are disposed in the flow range of the operating medium. To that end, the modulatable guide blade, or each such guide blade, can expediently be lowered into a housing segment of the gas turbine.

In accordance with another feature of the invention, the oncoming flow angle of each modulatable guide blade is adjustable. The result is an especially effective adaptation of the tangential velocity component of the operating medium of the gas turbine operating state.

The advantages attained with the invention are in particular that, by generating the spin in the operating medium in the gas turbine combustion chamber configuration, a tangential velocity component of the operating medium designed for an especially effective momentum transfer from the operating medium to the rotor blades of the gas turbine in full-load operation is established or generated. In accordance with known principles of fluid flow, the rifling swirl in the operating medium generated in the combustion chamber is preserved even upon outflow of the operating medium from the combustion chamber. The tangential velocity component of the operating medium required for good momentum transfer to the rotor blades of the gas turbine is thus assured in the region of the rotor blades even without the first set of guide blades. The rifling swirl is thus imposed and assured with especially simple means and especially reliably by the tilting of the primary axis of each burner relative to the primary axis of the turbine shaft.

Other features which are considered as characteristic for the invention are set forth in the appended claims.

Although the invention is illustrated and described herein as embodied in a gas turbine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a similar longitudinal section, and showing the arrangement and orientation of several of the burners;

FIG. 3 is a schematic view of the configuration of the burners in an annular combustion chamber of the gas turbine.

DESCRIPTION OF THE PREFERRED EMBODIMENTS

Figure 1:
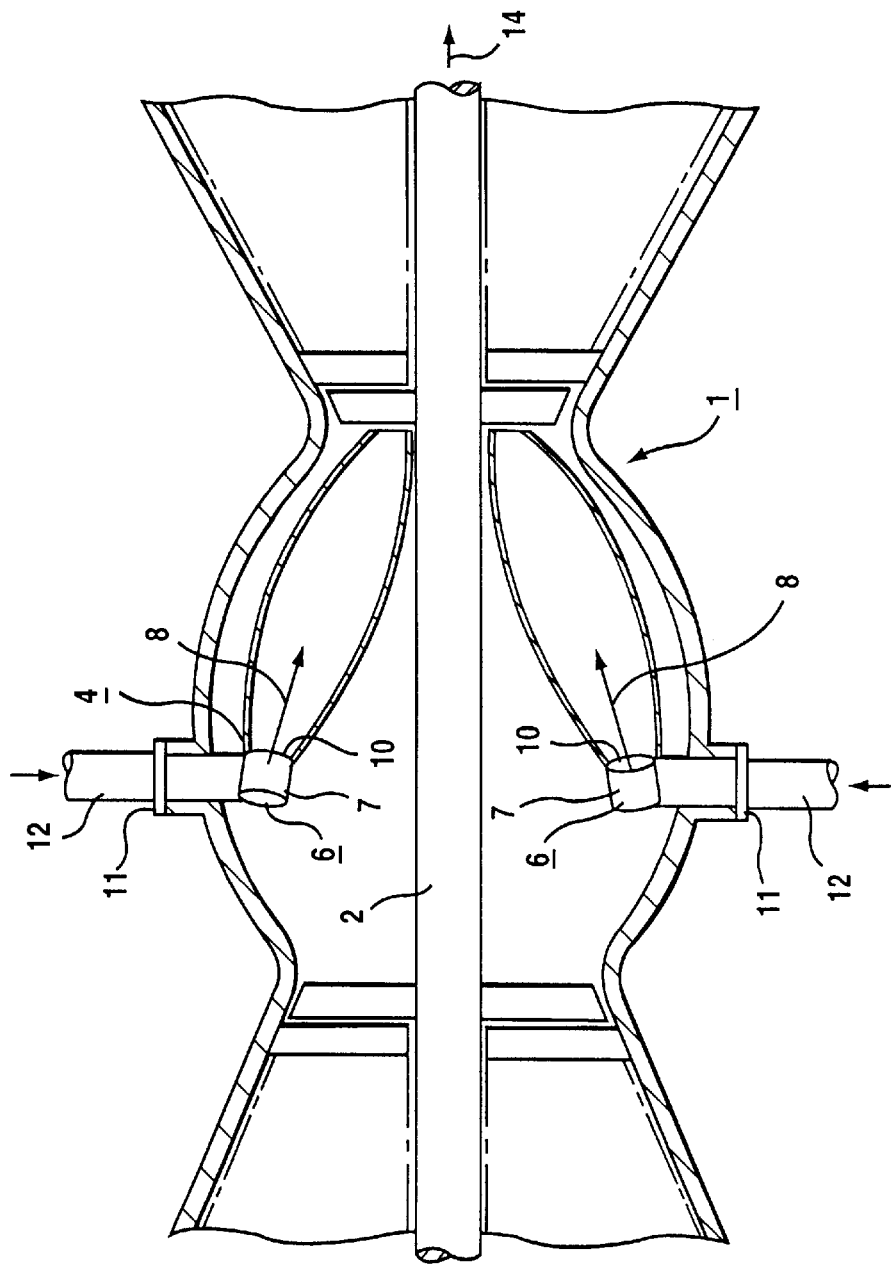
FIG. 1 is a partial, longitudinal section through a gas turbine with a plurality of burners.

Referring now to the figures of the drawing in detail and first, particularly, to FIGS. 1 and 2 thereof, there is seen a gas turbine 1. The gas turbine 1 includes a turbine shaft 2 and a combustion chamber configuration 4 with a number of burners 6. Each of the burners has a burner head 7. Each burner 6 also has a primary axis, represented by the arrows 8, which in operation of the respective burner 6 indicates the preferential direction of its burner flame. The primary axis 8 of a burner 6 is orthogonal to the outlet plane or burnout face 10 of its burner head 7. The burner head 7 of each burner 6 is connected via a flange connection 11 to a fuel supply means 12.

As shown in FIG. 3, the combustion chamber configuration 4 is an annular combustion chamber, with a combustion chamber into which the burners 6 discharge arranged in a ring around the turbine shaft 2. The primary axis 8 of each burner 6 is tilted relative to the primary axis 14, represented by the arrow, of the turbine shaft 2. The tilting serves to generate a rifling spin in an operating gas or operating medium AM, generated by this burner 6, around the primary axis 14 of the turbine shaft 2. The burners 6 are arranged symmetrically around the turbine shaft 2 in such a way that the primary axes 8 of all the burners 6 have the same tilting relative to the primary axis 14 of the turbine shaft 2.

In operation of the gas turbine 1, with the delivery of compressed air, a fuel is combusted to generate the operating medium AM in the burner heads 7 of the burners 6. Because of the tilting of the primary axes 8 of the burners 6 relative to the primary axis 14 of the turbine shaft 2, a swirl of the operating medium AM around the primary axis 14 of the turbine shaft 2 is generated. According to known flow principles, the swirl of the operating medium AM is preserved downstream even upon the emergence of the operating medium AM from the combustion chamber configuration 4. The flow of operating medium AM emerging from the combustion chamber configuration 4 thus has a zonal component, in addition to a meridional component.

Figure 4:
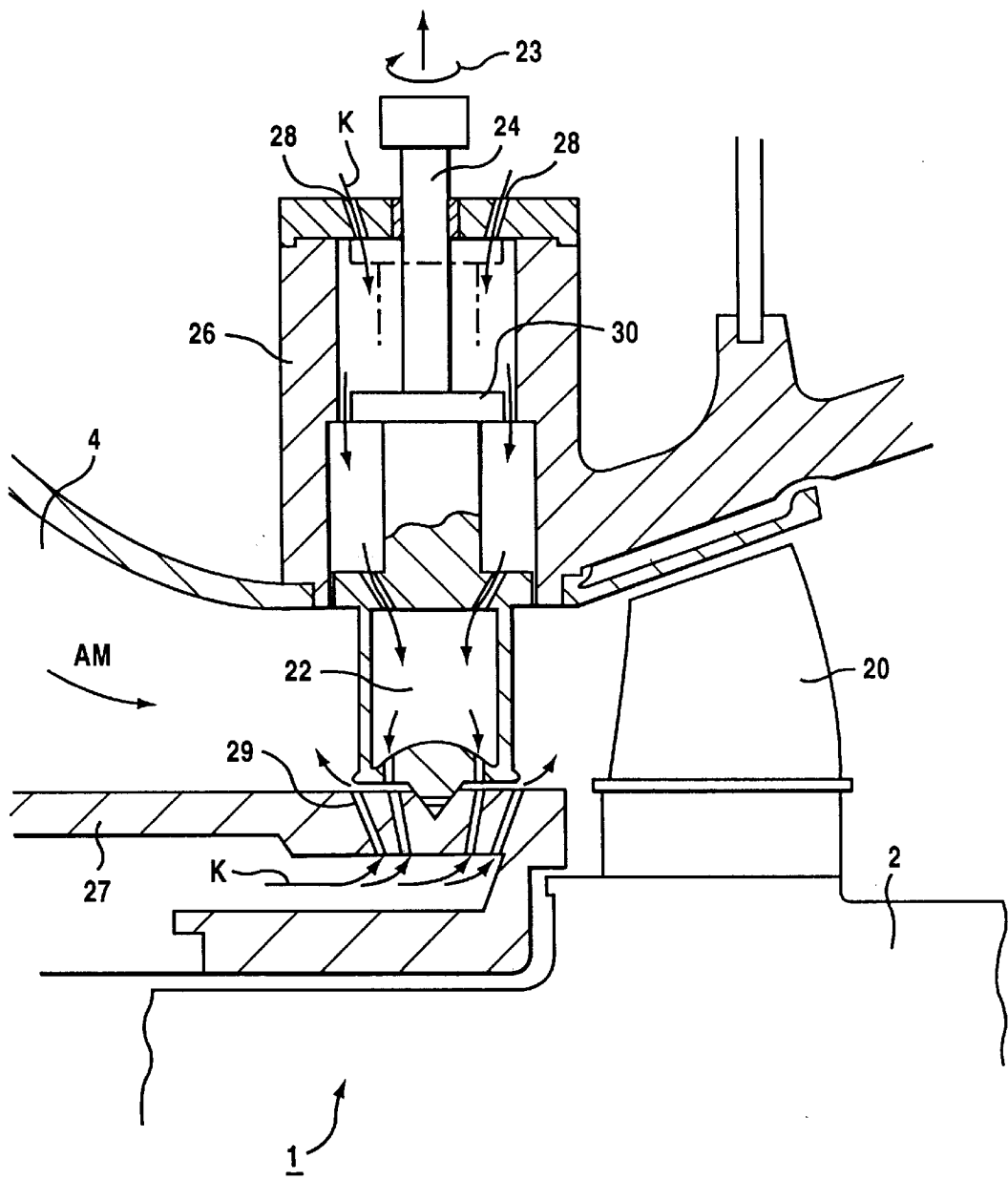
FIG. 4 is a partial section view of a detail of an outflow region of the annular combustion chamber.

As shown in FIG. 4, operating medium AM emerging from the combustion chamber configuration 4 meets a rotor blade configuration 20 that is connected to the turbine shaft 2. By means of a transfer of momentum to the rotor blade configuration 20, the operating medium AM sets the turbine shaft 2 into rotary motion. The swirl of the operating medium AM leaving the combustion chamber configuration 4 is dimensioned such that in full-load operation of the gas turbine 1, an especially effective transfer of momentum to the rotor blade configuration 20 results. Hence a diversion of the operating medium AM to improve the momentum transfer to the rotor blade configuration 20 by means of an additional guide blade configuration or guide baffles that require cooling, located upstream of the rotor blade configuration in the flow direction of the operating medium AM, with corresponding deflection losses, is unnecessary. As a result, the efficiency of the gas turbine 1 is increased.

In order even during a startup operation of the gas turbine 1 to assure an especially effective momentum transfer from the operating medium AM to the rotor blade configuration 20, a number of adjustable guide blades 22, one of which is shown in FIG. 4, is disposed downstream of the combustion chamber configuration 4 in terms of the flow direction of the operating medium AM. The guide blade 22 is disposed on a displaceable lifting and adjusting device 24 that is rotatable about an axis 23. In full-load operation of the gas turbine 1, the guide blade 2 can be lowered into a housing segment 26 of the gas turbine 1, so that it is not bathed by operating medium AM. In partial-load operation of the gas turbine 1, or in its startup process, the guide blade 22 can be moved into the flow range of the operating medium AM by lowering the lifting and adjusting device 24.

By rotating the lifting and adjusting device 24 about its axis 27, an especially good oncoming flow angle of the guide blade 22 is established upon startup of the gas turbine 1 and/or in partial-load operation. By this kind of modulatable oncoming flow angle, the operating medium AM emerging from the combustion chamber configuration 4 can be diverted in such a way that even in partial-load operation of the gas turbine 1, an especially effective transfer of momentum from the operating medium AM to the rotor blade configuration 20 is assured.

For cooling the guide blade 22, coolant conduits 28 and 29 are provided in the housing segment 26 and a further housing segment 27, respectively. In full-load operation of the gas turbine 1, the coolant conduits 28 are closed by a closure plug 30 disposed on the lifting and adjusting device 24, so that a delivery of cooling air K occurs, at a markedly reduced rate in comparison with the partial-load operation, only via the coolant conduits 29 now.

In operation of the gas turbine 1, an especially effective transfer of momentum of the operating medium AM to the rotor blade configuration 20 is thus assured for every load state. In full-load operation of the gas turbine 1, each guide blade 22 is lowered into the housing segment 23 provided for it, so that the operating medium AM meets the rotor blade configuration 20 without contacting any structural part. The required momentum transfer to the rotor blade configuration 20 is assured by means of the swirl of the operating medium AM. Cooling of structural parts disposed between the combustion chamber configuration 4 and the rotor blade configuration 20 during full-load operation of the gas turbine 1 is not necessary.

We claim:

1. A gas turbine, comprising:
   a turbine shaft extending along a primary turbine shaft axis;
   a combustion chamber configuration with a plurality of burners generating an operating medium from a fuel;
   each of said burners having a primary burner axis which is tilted relative to the primary axis of said turbine shaft so as to impose a swirl on the operating medium;
   a plurality of adjustable guide blades disposed downstream from said combustion chamber configuration in a flow direction of the operating medium; and
   a gas turbine housing with a housing segment, and wherein a respective said guide blade is disposed so as to be moveable into said housing segment of said gas turbine housing.

2. The gas turbine according to claim 1, wherein said burners are disposed symmetrically around said turbine shaft and wherein the primary axis of each of said burners has a substantially identical tilting relative to the primary axis of said turbine shaft.

3. The gas turbine according to claim 1, wherein said combustion chamber configuration is formed with a separate combustion chamber for each burner.

4. The gas turbine according to claim 3, wherein each of said separate combustion chambers of each burner is embodied and disposed such that the swirl is present in the operating medium upon an emergence thereof from said combustion chamber configuration.

5. The gas turbine according to claim 1, wherein said combustion chamber configuration is an annular combustion chamber.

6. A gas turbine, comprising:
   a turbine shaft extending along a primary turbine shaft axis;
   a combustion chamber configuration with a plurality of burners generating an operating medium from a fuel;
   each of said burners having a primary burner axis which is tilted relative to the primary axis of said turbine shaft so as to impose a swirl on the operating medium;
   a plurality of adjustable guide blades disposed downstream from said combustion chamber configuration in a flow direction of the operating medium; and
   a gas turbine housing with a plurality of housing segments, and wherein said guide blades are disposed so as to be movable into a respective said housing segment of said gas turbine housing.

7. The gas turbine according to claim 1, wherein said guide blades define an oncoming flow angle relative to the operating medium, said guide blades being disposed so as to render the oncoming flow angle adjustable.

8. The gas turbine according to claim 6, wherein said burners are disposed symmetrically around said turbine shaft and wherein the primary axis of each of said burners has a substantially identical tilting relative to the primary axis of said turbine shaft.

9. The gas turbine according to claim 6, wherein said combustion chamber configuration is formed with a separate combustion chamber for each burner.

10. The gas turbine according to claim 9, wherein each of said separate combustion chambers of each burner is embodied and disposed such that the swirl is present in the operating medium upon an emergence thereof from said combustion chamber configuration.

11. The gas turbine according to claim 6, wherein said combustion chamber configuration is an annular combustion chamber.

12. The gas turbine according to claim 6, wherein said guide blades define an oncoming flow angle relative to the operating medium, said guide blades being disposed so as to render the oncoming flow angle adjustable.

* * * * *